United States Patent
Deilmann et al.

(10) Patent No.: US 11,099,049 B2
(45) Date of Patent: Aug. 24, 2021

(54) METHOD FOR OPERATING A MEASURING DEVICE AND A MEASURING DEVICE

(71) Applicant: KROHNE Messtechnik GmbH, Duisburg (DE)

(72) Inventors: Michael Deilmann, Essen (DE); Michael Gerding, Bochum (DE)

(73) Assignee: KROHNE MESSTECHNIK GMBH, Duisburg (DE)

( * ) Notice: Subject to any disclaimer, the term of this patent is extended or adjusted under 35 U.S.C. 154(b) by 0 days.

(21) Appl. No.: 15/663,939

(22) Filed: Jul. 31, 2017

(65) Prior Publication Data
US 2018/0038726 A1    Feb. 8, 2018

(30) Foreign Application Priority Data

Aug. 8, 2016  (DE) .................... 10 2016 114 647.1

(51) Int. Cl.
*G01F 25/00* (2006.01)
*G01F 23/284* (2006.01)
*G01F 1/00* (2006.01)
G01F 23/00 (2006.01)

(52) U.S. Cl.
CPC .............. *G01F 23/284* (2013.01); *G01F 1/00* (2013.01); *G01F 25/0007* (2013.01); *G01F 25/0061* (2013.01); *G01F 25/0076* (2013.01); G01F 23/00 (2013.01)

(58) Field of Classification Search
CPC ...... G01F 23/284; G01F 1/00; G01F 25/0007; G01F 25/0061; G01F 25/0076; G01F 23/00

USPC ....... 73/293, 290 R, 290 B, 290 V, 291–334, 73/305–308, 312, 313, 314
See application file for complete search history.

(56) References Cited

U.S. PATENT DOCUMENTS

| | | | | |
|---|---|---|---|---|
| 3,139,407 A | * | 6/1964 | Hutto | C07C 5/2789 502/169 |
| 4,503,994 A | * | 3/1985 | Pyle | B67D 7/46 141/198 |
| 4,763,075 A | | 8/1988 | Weigert | |

(Continued)

FOREIGN PATENT DOCUMENTS

| | | |
|---|---|---|
| DE | 103 08 652 A1 | 9/2004 |
| DE | 10 2011 075 238 A1 | 11/2012 |
| EP | 0 416 1631 A1 | 3/1991 |

*Primary Examiner* — Robert R Raevis
(74) *Attorney, Agent, or Firm* — David S. Safran; Roberts Calderon Safran & Cole, P.C.

(57) ABSTRACT

A method for operating a measuring device having at least one measured value sensor for recording and forwarding measured values of a primary measured variable. To ensure a particularly high reliability and measuring accuracy, the recording of the measured value and/or the forwarding of the measured value is carried out in dependence on the operating state of the measuring device, recording of the measured value and/or the forwarding of the measured value being interrupted during a disturbance. The measuring device is wherein the measured value sensor is designed in such a manner that the recording of the measured value and/or the forwarding of the measured value is carried out in dependence on the operating state of the measuring device, wherein the recording of the measured value or the forwarding of the measured value is interrupted during a disturbance.

14 Claims, 2 Drawing Sheets

(56) References Cited

U.S. PATENT DOCUMENTS

| | | | |
|---|---|---|---|
| 5,182,953 A * | 2/1993 | Ellinger | G01L 3/101 |
| | | | 324/244.1 |
| 5,224,387 A | 7/1993 | Lindenbaum et al. | |
| 7,819,002 B2 * | 10/2010 | Spanke | G01F 23/2962 |
| | | | 73/290 V |
| 8,855,867 B2 | 10/2014 | Günther et al. | |
| 9,274,154 B2 | 3/2016 | Togura | |
| 9,494,163 B2 | 11/2016 | Isono et al. | |
| 9,684,061 B2 | 6/2017 | Bilgic et al. | |
| 9,784,703 B2 | 10/2017 | Budde | |
| 2003/0140510 A1 * | 7/2003 | Woods | G01C 17/38 |
| | | | 33/357 |
| 2004/0079150 A1 * | 4/2004 | Breed | B60J 10/00 |
| | | | 73/291 |
| 2009/0320609 A1 * | 12/2009 | Xia | G01M 11/081 |
| | | | 73/862.08 |
| 2010/0042340 A1 * | 2/2010 | Piszko | G01F 9/008 |
| | | | 702/55 |
| 2012/0073354 A1 * | 3/2012 | Joosten | G01F 23/0023 |
| | | | 73/1.73 |
| 2016/0011032 A1 | 1/2016 | Hogendoorn et al. | |
| 2016/0169728 A1 | 6/2016 | Romstoeck et al. | |
| 2016/0231162 A1 | 8/2016 | Schmid et al. | |

* cited by examiner

METHOD FOR OPERATING A MEASURING DEVICE AND A MEASURING DEVICE

BACKGROUND OF THE INVENTION

Field of the Invention

The invention relates to a method for operating a measuring device, in particular a fill level or flow measuring device, wherein the measuring device has at least one measured value sensor for recording and forwarding measured values of a primary measured variable. In addition, the invention relates to a measuring device with at least one measured value sensor for recording and forwarding measured values of a primary measured variable.

Description of Related Art

In many areas of process measurement technology, the measurement is superimposed by process-induced interferences. If such a disturbance affects the measured variable, the determined measured values are erroneous with respect to the true value of the measured variable. As a result, the reliability as well as the measurement accuracy of the measuring device is reduced.

The present invention relates in particular to the operation of fill level measuring devices and the operation of flowmeters. Depending on the respective measuring principle, primary measured variables within the scope of the present invention are, in particular, the transit time of a signal, the deflection of a measuring tube or, as a derived variable, the phase difference between the oscillations of a measuring tube at different points of the measuring tube or the pressure differences within a medium. However, variables derived from these measured variables, such as, in particular, the fill level in a container and the flow rate of a medium through a pipeline, are primary measured variables in the sense of the present invention.

A measuring principle for determining the fill level of a medium in a container is the transit time method. In this case, an electromagnetic signal is either guided or freely emitted in the direction of the medium, and the filling level of the medium in the container is determined by evaluating the transit time of the signal reflected on the surface of the medium. During the filling of the container, the situation can arise that the medium to be filled crosses the electromagnetic signal, which means that an erroneous, i.e. too high, filling level is determined. In addition, stirrers for mixing the medium are often arranged inside the container, which also cross the signal beam and can thereby interfere with and/or distort the measurement value.

In the field of flow measurement technology, empty or partially filled pipelines can lead to incorrect measured values. A method for operating a nuclear magnetic flowmeter, in particular for determining the flow rate of a medium with surge flow, is known from the German Patent DE 10 2014 015 943 B3 and corresponding U.S. Patent Application Publication 2016/0011032 A1. A surge flow is characterized by a first region consisting of a surge of liquid medium and a second region consisting of a large gas bubble which occupies a dominant part of the measuring tube cross-section and a liquid film which fills the remaining part of the measuring tube cross-section. To differentiate the different phases of the medium from one another, the flowmeter is recalibrated for the respective phases.

Furthermore, in the field of distance and thickness measurement, confocal sensors are known in which the recording and output of the measurement value can be controlled by an external electrical trigger signal or by command (micro-epsilon, operating instructions confocal DT 2451/2461/2471, page 57 et seq.). Decisive for the start of the measured value output or recording is the presence of a previously determined signal level or signal form at the trigger input or a corresponding software command A further differentiation is made between the triggering of the recording of the measured value, at which the calculation of the measured value takes place only after a fulfilled trigger condition, and the triggering of the output of the measured value, wherein the calculation of the measured values is carried out continuously and independently and a fulfilled trigger condition triggers the output of the measured values.

SUMMARY OF THE INVENTION

Based on the previously described prior art, the object of the present invention is to provide a method for operating a measuring device which ensures a particularly high reliability and measuring accuracy.

In addition, a further object of the invention is to provide a measuring device with a particularly high measuring accuracy.

According to a first teaching of the present invention, the aforementioned object is achieved by means of a method mentioned at the outset in that that the recording of the measured value and/or the forwarding of the measured value is carried out in dependence on the operating state of the measuring device. In general, the operating states of a measuring device can be divided into the following three categories: operation, disturbance and standstill. According to the invention, a disturbance is distinguished by the fact that the measured value deviates from the true value of the measured variable, wherein the deviation is greater than the usual measurement uncertainty, and wherein the deviation is due, in particular, to process-related disturbances.

Such a disturbance can be caused by the filling process or the emptying of a container within the scope of level measurement. If the filling stream crosses the signal beam for measuring the fill level, an erroneous fill level is determined. A regularly recurring disturbance during level measurement is due, for example, to the presence of a stirrer in a container. The blade of the stirrer can also pass the signal beam and thus influence the measured value of the filling level.

According to the invention, it has been recognized that the recording of the measured value and/or the forwarding of the measured value can be synchronized with the operating state of the measuring device. A recording of the measured value or a forwarding of the measured value is thereby carried out only if there is no disturbance. As a result, erroneous measurements can already be avoided in advance, or the transmission of erroneous measured values can be avoided if the recording of the measured value is carried out even in the case of disturbances. In any case, the output of incorrect measurements is avoided according to the invention so that they are not taken into account in further analysis, in particular in statistical analysis. In this respect, a measuring device operated with a method according to the invention has a particularly high reliability of the measured values and an improved measuring accuracy.

In the presence of a disturbance, a distinction is basically made between periodically occurring disturbances, for example, caused by the presence of a stirrer in the container during filling level determination, wherein the stirrer blades cross the signal beam at regular intervals and single or irregularly occurring disturbances, for example, caused by the presence of gas bubbles in the medium during the flow measurement.

According to a first implementation of the method according to the invention, the recording of the measured values takes place continuously or periodically. Preferably, the method according to the invention thus relates to measuring devices which are used for the permanent monitoring of at least one measured variable. This implementation of the method therefore makes it possible to interrupt a continuous measurement temporarily or event-controlled in order to avoid erroneous measurements.

According to a further advantageous design, the measured value sensor has a trigger, wherein the trigger interrupts the recording of the measured value or the forwarding of the measured value in the case of at least one fulfilled trigger condition, wherein the at least one trigger condition is fulfilled in the presence of a disturbance.

The trigger condition can be dependent on or independent of the present measured value of the primary measured variable.

If the trigger condition is dependent on the present measured value, the recording of the measured value is carried out first, then the trigger condition is evaluated by the trigger. Subsequently, the forwarding of the measured value is interrupted if the trigger condition is fulfilled or the measured value is forwarded if the trigger condition is not fulfilled. The evaluation of the trigger condition can take place after the recording of the measured value of each individual measured value or alternatively after the recording of the measured value of a plurality of measured values, for example after the recording of 10 or 100 or 500 measured values. Preferably, the measured values recorded before the evaluation of the trigger condition are stored in an intermediate memory before the measured values are forwarded.

If the trigger condition is independent of the present measured value, the trigger condition can be evaluated before the measured value is recorded and the trigger can interrupt the recording of the measured value if the trigger condition is fulfilled. Alternatively, the trigger condition can be evaluated simultaneously or chronologically after the recording of the measured value, where the trigger then interrupts the forwarding of the measurement value when the trigger condition is fulfilled.

The trigger preferably has a physical trigger input, wherein a trigger condition is fulfilled exactly when an external trigger signal is supplied to the trigger via the trigger input. Particularly preferably, the measuring device is connected to a further device during operation, which causes a disturbance via the trigger input. The device causing the disturbance can then, for example, send a signal to the trigger input when a measurement-influencing process takes place, i.e. if there is a disturbance. In this case, the trigger condition is independent of the measured value. Therefore, according to an advantageous design, the trigger condition is evaluated before the recording of the measured value. If the trigger condition is fulfilled, the recording of the measured value is interrupted for as long as the trigger condition is fulfilled.

Alternatively or additionally, if the other device regularly causes recurring disturbances, the device causing the disturbances can transmit the frequency of the disturbance to the trigger. The measuring device is then preferably synchronized with the trigger signal in such a manner that, in the case of periodic disturbances, the recording of the measured value takes place only when no disturbance is present.

Particularly preferably, the external trigger signal is configured within a message according to a data protocol. In this design, the measuring device is connected to the further device via an interface which allows communication based on the data protocol, wherein the message containing the trigger signal is transmitted via the interface to the measuring device or to the measured value sensor. The interface may, for example, be a fieldbus interface (CAN, HART) or also an interface according to the Ethernet standard.

In an advantageous manner, the recording of individual measured values can be triggered using one of the previously described methods, whereby the measuring device operated with the method ensures a particularly high measurement accuracy.

According to a further embodiment, at least one upper limit value and/or a lower limit value is stored in the trigger, wherein a trigger condition comprises a comparison operation with the upper limit value and/or the lower limit value. If, for example, the upper limit value is exceeded or the lower limit value is not reached, the trigger condition is fulfilled and the recording of the measured value or the forwarding of the measured value is interrupted.

The upper limit value is preferably the maximum measured value difference between two successive measured values of the primary measured variable. As expected, no sudden changes in measured variables occur in process measurement technology, so that at least an upper limit value can be established for the difference between two successive measured values, also referred to as the measured value difference in the context of the present invention. This upper limit value can also be determined statistically.

According to this embodiment of the method of the invention, the measured value sensor initially determines at least two measured values, which the measured value sensor transmits to the trigger. The trigger forms the difference between two successive measured values and compares the present measured value difference or differences determined in this manner with the stored limit value of the measured value difference. If at least one present measured value difference is greater than the limit value, the trigger condition is fulfilled and the trigger interrupts the forwarding of the measurement value. According to this embodiment of the method according to the invention, there is therefore a disturbance in the event of a sudden change in the primary measured variable.

It is also advantageous when, alternatively or additionally, at least one electrical characteristic is determined and when a limit value is the maximum change in the electrical characteristic. An electrical characteristic is a variable that is characteristic for a measuring operation, which does not change or changes only slightly in the course of the measuring process. Such a characteristic can be, for example, the noise floor or the amplitude of the measured values. According to this implementation of the method, an output value of the electrical characteristic variable is preferably stored in the trigger, wherein the output value corresponds to the value of the electrical characteristic value at the start of the measurement.

The electrical characteristic is preferably determined by the measured value sensor. To this end, first one or more measured values are determined, from which the present value of the electrical characteristic is determined. Alternatively, the determination can be performed by an external sensor, which transmits the value of the electrical characteristic to the measuring device or to the trigger. The trigger determines the deviation between the present value of the electrical characteristic and the stored output value and compares it with the limit value. If the deviation is higher than the limit value of the deviation, the trigger condition is fulfilled and the trigger interrupts the forwarding of the measurement value.

According to a further embodiment, at least one secondary measured variable is determined, wherein a limit value is the maximum change in the secondary measured variable. The secondary measured variable can be determined either by the measured value sensor or an external sensor, which transfers the value of the secondary measured variable to the trigger. A secondary measured variable is, for example, the temperature or the pressure in the container containing the medium or in the pipe through which the medium flows. As expected, neither operating parameter changes or changes only insignificantly during a measurement so that the primary measured variable can be determined reliably. Preferably, an output value of the secondary measured variable is stored in the trigger, wherein the output value corresponds to the value of the secondary measured variable at the start of the measurement.

According to this implementation of the method, the trigger determines the deviation between the present measured value of the secondary measured variable and the initial value. If the difference is higher than the set upper limit value, the trigger condition is fulfilled and the trigger interrupts the forwarding of the measured value. A particularly abrupt change in the secondary measured variable according to this embodiment corresponds to a disturbance of the measuring device.

According to a further implementation, the trigger has a physical trigger input, wherein a first trigger condition is fulfilled exactly when an external trigger signal is supplied to the trigger via the trigger input. In addition, the trigger also interrupts the recording of the measured value and/or the forwarding of the measured value if, alternatively or additionally, a second trigger condition is fulfilled, wherein at least one limit value is stored in the trigger and the second trigger condition comprises a comparison operation with the limit value.

Furthermore, the measured value sensor can have a time unit for detecting the real time, in particular a real-time clock, wherein the time unit assigns a time to the state of a disturbance, and wherein the time unit determines the period of these disturbances in the case of intermittent disturbances, and wherein the recording of the measured value or the forwarding of the measured value is synchronized with this period.

It is particularly preferred to assess whether a disturbance is present according to one of the previously described methods using the trigger of the measured value sensor. In particular, the time at which the recording of the measured value and/or the forwarding of the measured value is interrupted is recorded in each case. As the operating time of the measuring device increases, it is thus possible to identify regularly recurring disturbances using the time unit as such, and to take it into account in the recording of the measurement value or the forwarding of the measurement value.

When considering the recurring disturbance, it is understood here that the measured value sensor, as soon as the time unit has detected a periodic disturbance, automatically interrupts the recording of the measured value or the forwarding of the measured value in synchronization with the period of the disturbance.

A measuring device operated according to this method is thus capable of independently detecting disturbances and automatically taking these into consideration as described.

According to a second teaching, the object mentioned at the outset is achieved by a measuring device in that the measured value sensor is configured in such a manner that the recording of the measured value and/or the forwarding of the measured value takes place in dependence on the operating state of the measuring device, wherein the recording of the measured value or the forwarding of the measured value is interrupted during a disturbance. Advantageously, a measuring device is provided that takes into account disturbances affecting the measured variable and thus the reliability and the accuracy of the measuring device, as early as when the measured values are provided.

According to an advantageous embodiment of the measuring device, the measuring device has a time unit and/or a trigger, in particular with a physical trigger input.

The measuring device is particularly preferably designed such that the measuring device carries out one of the above-described methods during operation.

In detail, there is a plurality of possibilities for designing and further developing the method and the measuring device according to the invention as will be apparent from the following description of preferred embodiments in conjunction with the accompanying drawings.

DETAILED DESCRIPTION OF THE INVENTION

Figure 1:
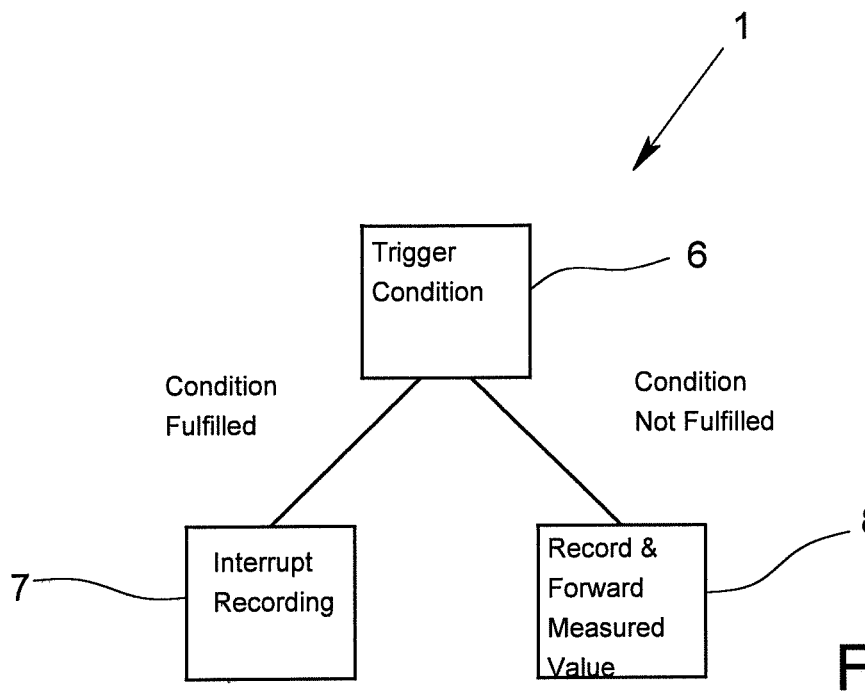
FIG. 1 is a diagram illustrating a first embodiment of a method according to the invention.

FIG. 1 shows a first embodiment of a method 1 according to the invention for operating a measuring device 2, wherein the measuring device 2 has at least one measured value sensor 3 for recording and forwarding measured values of a primary measured variable, and wherein the measured value sensor 3 has a trigger 4, wherein the trigger 4 interrupts the recording of the measured value in the event of a fulfilled trigger condition, wherein the trigger condition is fulfilled in the event of a disturbance.

In the illustrated embodiment, the trigger 4 has a physical trigger input 5, via which the trigger 4 is connected to a device causing a disturbance. This device sends a trigger signal via the trigger input 5 to the trigger 4, as soon as a process disturbing measurement takes place.

In a first step 6 of the method, the trigger 4 evaluates whether the trigger condition is fulfilled. This is the case when a trigger signal is present at the trigger input 5. If the trigger condition is fulfilled, the trigger interrupts the recording of the measured value in a next step 7 and then checks again whether the trigger condition is still fulfilled.

If the trigger condition is not fulfilled, the recording of the measured value and the forwarding of the measured value are carried out in a next step 8.

Figure 2:
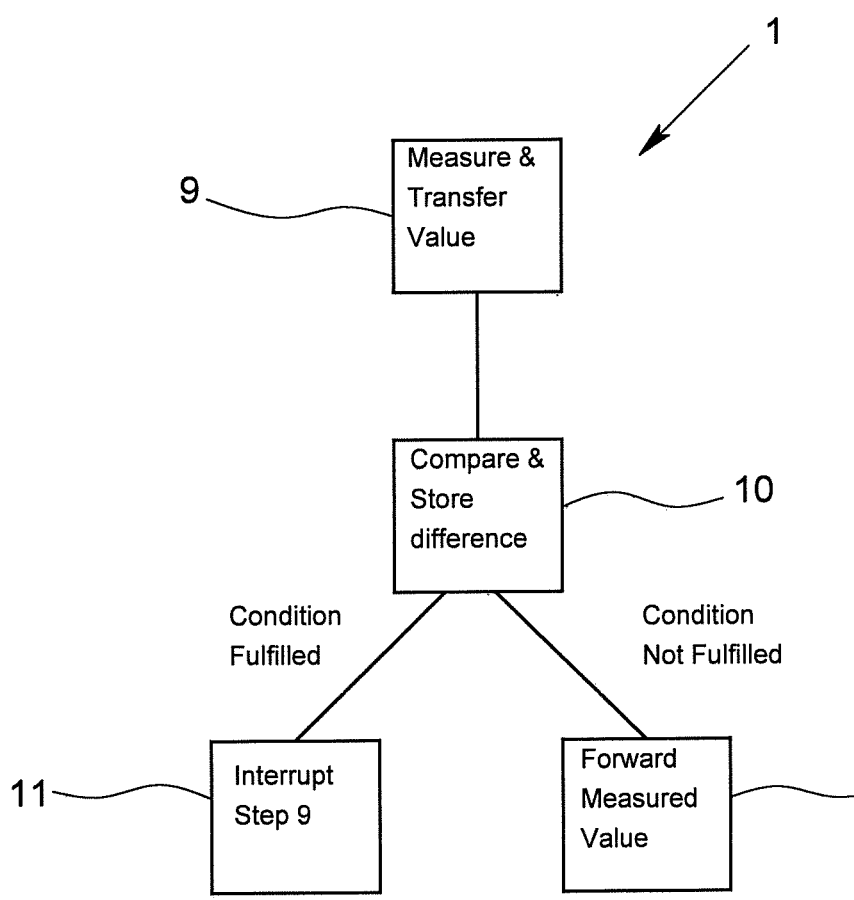
FIG. 2 is a diagram illustrating a second embodiment of a method according to the invention.

FIG. 2 shows a second embodiment of a method 1 according to the invention for operating a measuring device, wherein the measuring device 2 has at least one measured value sensor 3 for recording and forwarding measured values of a primary measured variable, and wherein the measured value sensor 3 has a trigger 4, wherein the trigger 4 interrupts the recording of the measured value in the event of a fulfilled trigger condition, wherein the trigger condition is fulfilled in the event of a disturbance.

According to the illustrated embodiment, the trigger condition is dependent on the measured values determined by the measured value sensor 3.

For this purpose, a limit value for the measured value difference of two consecutive measured values of the primary measured variable is stored in the trigger 4. The trigger condition is fulfilled exactly when the present measured value difference is greater than the limit value of the measured value difference. In this respect, a disturbance is present when the primary measured value changes abruptly.

In a first step 9, the measured value sensor 3 determines at least two measured values of the primary measured variable and transfers these to the trigger 4. In a subsequent step 10, the trigger 4 determines the present measured value difference between two successive measured values and compares the present measured value difference or differences with the stored limit value. If at least one measured value difference is greater than the stored limit value, then the trigger interrupts the forwarding of the measured value in a next step 11. If the present measured value differences or difference is lower than the stored limit value, then the trigger condition is not fulfilled and the measured values are forwarded in a next step 12.

Figure 3:
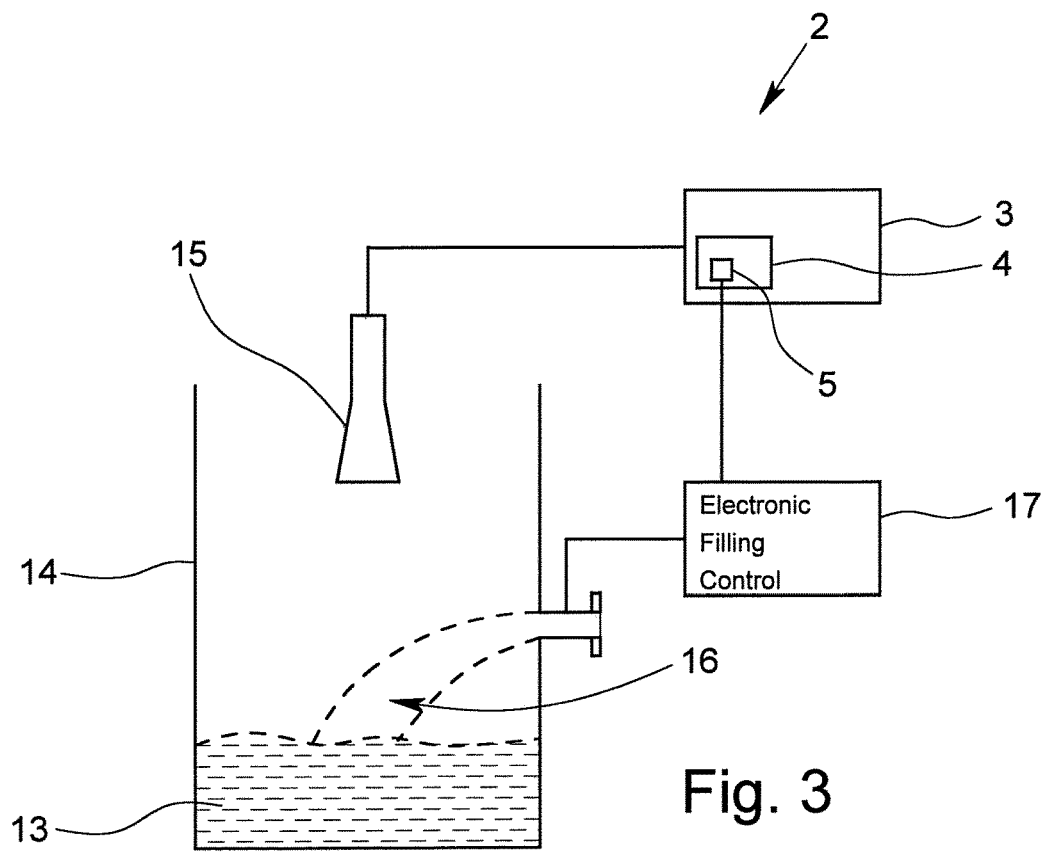
FIG. 3 is a first embodiment of a measuring device according to the invention, in operation.

FIG. 3 schematically shows a first embodiment of a measuring device 2 according to the invention with a measured value sensor 3 for recording and forwarding measured values of a primary measured variable, wherein the measured value sensor 3 has a trigger 4, wherein the trigger 4 interrupts the recording of the measured value in the event of a fulfilled trigger condition, wherein the trigger condition is fulfilled in the event of a disturbance.

Presently, the measuring device 2 is designed as a fill level measuring device 2. The level measuring device 2 has an antenna 15, which emits an electromagnetic signal in the direction of the medium 13, for measuring the fill level of a medium 13 in a container 14. During operation, the fill level of the medium 13 in the container 14 is determined from the transit time of the part of the signal reflected on the medium 13.

During the filling process of the container 14, the situation may arise that the filling stream 16 crosses the electromagnetic signal and thus falsifies the measured values of the filling level.

In order to counter this situation, the measured value sensor 3 has a trigger 4 with a trigger input 5, via which the measuring device 2 is connected to the electronic unit 17 controlling the filling process. During operation, the electronic unit transmits a trigger signal to the trigger 4 when a filling process takes place. In response to the trigger signal, the trigger 4 interrupts the recording of the measured value of the measuring device. This has the advantage that erroneous measured values can be avoided, whereby the reliability and the measuring accuracy of the measuring device are improved.

Figure 4:
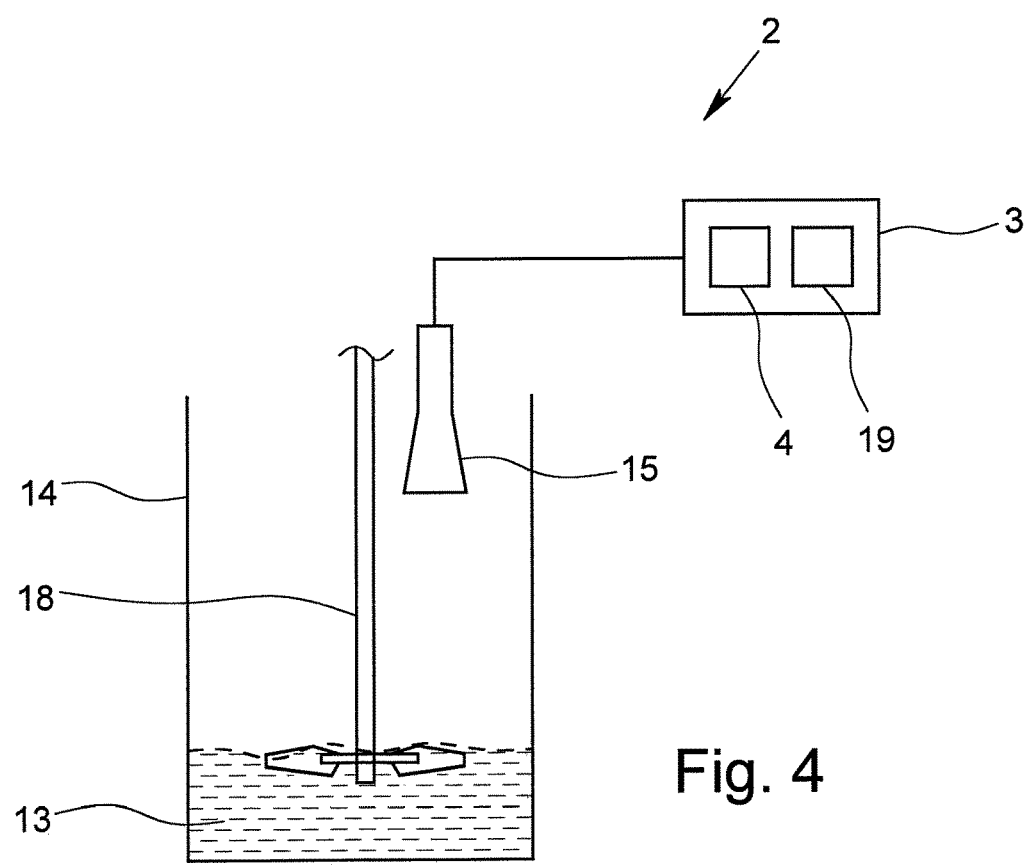
FIG. 4 is a second embodiment of a measuring device according to the invention, in operation.

FIG. 4 shows a second embodiment of a measuring device 2 according to the invention with a measured value sensor 3 for recording and forwarding measured values of a primary measured variable, wherein the measured value sensor 3 has a trigger 4, wherein the trigger 4 interrupts the recording of the measured value in the event of a fulfilled trigger condition, wherein the trigger condition is fulfilled in the event of a disturbance. The measuring device is also designed as a fill level measuring device 2 and, like the first embodiment shown in FIG. 3, has an antenna 15 that emits an electromagnetic signal in the direction of the medium 13 for measuring the fill level of a medium 13 in a container 14.

In contrast to the situation shown in FIG. 3, a stirrer 18 is additionally arranged in the container 14, which, during operation, intermittently crosses the signal for determining the fill level at regular time intervals, which in this respect falsifies the fill level measurement at regular intervals.

In order to counteract this, the measured value sensor 3 has a time unit 19 which assigns a time to the state of a disturbance during operation and which determines the period of these disturbances from periodically occurring disturbances.

In the illustrated embodiment, the recording of the measured value during operation is synchronized with the disturbance based on the period of the disturbance determined by the time unit 19 of the measuring device. This means that, during operation, the measured value is recording only if there is no disturbance. The recording of the measurement value is automatically interrupted with the period determined by the time unit 19.

A measuring device 2 operated according to this method is thus capable of independently detecting disturbances and taking them into account correspondingly.

What is claimed is:

1. A method for operating a measuring device having at least one measured value sensor for recording measured values of a primary measured variable, comprising the steps of:

measuring a primary variable with at least one measured value sensor and including emitting a signal beam in a direction of the medium, recording values of the primary variable measured in dependence on an operating state of the measuring device, and interrupting the recording of the values measured during a disturbance, wherein the primary variable measured is a fill level of a medium in a container, and wherein the disturbance during which recording of measurements is interrupted is an operating state during which the container is being filled with the medium and a fill stream of the medium being filled into the container crosses the signal beam.

2. The method according to claim 1, wherein the recording of the measured values takes place continuously or periodically.

3. The method according to claim 1, wherein the signal beam is an electromagnetic signal, wherein the measured value sensor includes an antenna configured to emit the electromagnetic signal in a direction of the medium and to receive the electromagnetic signal reflected from the medium for measuring the primary variable, wherein the measured value sensor comprises a trigger and wherein the interrupting of recording of the measured value is produced in the event of at least one fulfilled trigger condition of the trigger, and wherein the at least one trigger condition is fulfilled in the case of a disturbance.

4. The method according to claim 3, wherein the trigger has a trigger input via which an external trigger signal is received, and wherein a trigger condition is fulfilled exactly when the external trigger signal is supplied to the trigger via the trigger input.

5. The method according to claim 4, wherein the external trigger signal is configured within a message according to a data protocol, wherein the measuring device is connected to a further device via an interface which allows communication based on the data protocol, and wherein the message containing the trigger signal is transmitted via the interface to the measured value sensor.

6. The method according to claim 3, wherein at least one limit value is stored in the trigger and wherein the trigger condition comprises comparing at least one measured value with the limit value.

7. The method according to claim 6, wherein a limit value is a maximum measured value difference between two successive measured values of the measured variable.

8. The method according to claim 6, wherein at least one electrical characteristic is determined and wherein a limit value is a maximum change in the electrical characteristic.

9. The method according to claim 6, wherein at least one secondary measured variable is determined and wherein a limit value is a maximum change in the secondary measured variable.

10. The method according to claim 1, wherein the measuring device has a time unit for detecting real time,
wherein the time unit assigns a time to a state of a disturbance and wherein the time unit determines the period of disturbances in the case of periodically occurring disturbances, and
wherein the recording of the measured value is synchronized with the determined period of disturbances.

11. A measuring device, comprising:
at least one measured value sensor for recording measured values of a measured variable comprised of a fill level of a medium in a container;
an antenna for emitting a signal beam in a direction of the medium, and
a rotating stirrer in the path of the signal beam that periodically disturbs the signal beam,
wherein the at least one measured value sensor comprises a trigger configured to automatically interrupt the recording of the measured values at a time when recording of measurements is in an operating state during which a stirrer in the container is being operated based on a period of the disturbance determined by a time unit of the at least one measured value sensor so that the measured value is recorded only when there is no disturbance.

12. The measuring device according to claim 11, wherein the measured value sensor has a time unit that is operative for detecting real time and assigning a time to occurrence of the signal being disturbed.

13. A measuring device, comprising:
at least one measured value sensor for recording measured values of a measured variable comprised of a fill level of a medium in a container; and
an antenna for emitting a signal beam in a direction of the medium,
wherein the at least one measured value sensor comprises a trigger configured to interrupt the recording of the measured values in response to a trigger condition being fulfilled at a time when recording of measurements is in an operating state during which the signal is disturbed by a fill stream of the medium being filled into the container crossing the signal beam,
wherein a limit value for a measured value difference of two consecutive measured values of the primary measured variable is stored in the trigger, and
wherein the trigger condition is fulfilled when a present measured value difference is greater than the limit value of the measured value difference due to an abrupt change in the primary measured value resulting from the fill stream of the medium being filled into the container crossing the signal beam.

14. A method for operating a measuring device having at least one measured value sensor for recording measured values of a primary measured variable, comprising the steps of:
measuring the primary variable with the at least one measured value sensor,
recording values of the primary variable measured in dependence on an operating state of the measuring device, and
interrupting the recording of the values measured during a disturbance, wherein the primary variable measured is a fill level of a medium in a container, and wherein the disturbance during which recording of measurements is periodically interrupted in an operating state by a stirrer being operated in the container based on a period of the disturbance determined by a time unit of the measuring device so that the measured value is recorded only when there is no disturbance,
wherein the measuring of the primary variable includes emitting a signal beam in a direction of the medium, and
wherein the disturbance is a disturbance of the signal beam by a blade of the stirrer passing through the signal beam.

* * * * *